United States Patent
Pradhan et al.

(10) Patent No.: US 11,814,467 B2
(45) Date of Patent: Nov. 14, 2023

(54) PROCESS FOR THE PRODUCTION OF POLYURETHANE FOAMS

(71) Applicant: SHELL OIL COMPANY, Houston, TX (US)

(72) Inventors: Pranaya Man Singh Pradhan, Bangalore (IN); Eswaramurthi Nachiappan, Bangalore (IN); Michiel Barend Eleveld, Amsterdam (NL); Prem Kumar Dhanapal, Bangalore (IN)

(73) Assignee: SHELL USA, INC., Houston, TX (US)

( * ) Notice: Subject to any disclaimer, the term of this patent is extended or adjusted under 35 U.S.C. 154(b) by 252 days.

(21) Appl. No.: 16/063,952

(22) PCT Filed: Dec. 19, 2016

(86) PCT No.: PCT/EP2016/081785
§ 371 (c)(1),
(2) Date: Jun. 19, 2018

(87) PCT Pub. No.: WO2017/108711
PCT Pub. Date: Jun. 29, 2017

(65) Prior Publication Data
US 2020/0270391 A1 Aug. 27, 2020

(30) Foreign Application Priority Data
Dec. 21, 2015 (IN) ............. 6795/CHE/2015

(51) Int. Cl.
*C08G 18/48* (2006.01)
*C08G 18/76* (2006.01)

(52) U.S. Cl.
CPC ....... *C08G 18/4816* (2013.01); *C08G 18/485* (2013.01); *C08G 18/7621* (2013.01); *C08G 2110/0083* (2021.01)

(58) Field of Classification Search
CPC ............ C08G 18/4833; C08G 18/4841; C08G 18/4845; C08G 18/485; C08G 2101/0008
See application file for complete search history.

(56) References Cited

U.S. PATENT DOCUMENTS

| | | | |
|---|---|---|---|
| 5,648,559 A | 7/1997 | Hager | |
| 5,814,676 A * | 9/1998 | Jacobs | ........... C08G 18/4812 521/174 |
| 6,008,263 A | 12/1999 | Thompson et al. | |
| 9,029,432 B2 | 5/2015 | Aou et al. | |
| 2004/0147627 A1 * | 7/2004 | Hager | ........... C08L 75/04 521/174 |
| 2006/0084710 A1 | 4/2006 | Meyer-Ahrens et al. | |
| 2015/0336306 A1 * | 11/2015 | Hahn | ........... B29C 44/04 428/217 |
| 2018/0265622 A1 * | 9/2018 | Roh | ........... C08G 18/18 |

FOREIGN PATENT DOCUMENTS

| | | |
|---|---|---|
| CN | 1358799 A | 7/2002 |
| CN | 101497691 A | 8/2009 |
| CN | 102666624 A | 9/2012 |
| DE | 102004047406 A1 | 3/2006 |
| EP | 1273605 A1 | 1/2003 |
| EP | 1589071 A1 | 10/2005 |
| RU | 2198187 C2 | 2/2003 |
| RU | 2270205 C2 | 2/2006 |
| RU | 2422469 C2 | 6/2011 |
| WO | 9824827 A1 | 6/1998 |
| WO | 9956874 A1 | 11/1999 |
| WO | 2006002807 A1 | 1/2006 |
| WO | WO-2014079788 A1 * | 5/2014 ............ B29C 44/04 |
| WO | WO-2017062150 A1 * | 4/2017 ............ C08K 5/053 |

OTHER PUBLICATIONS

International Search Report and Written Opinion received for PCT Patent Application No. PCT/EP2016/081785, dated Mar. 22, 2017, 8 pages.
International Search Report and Written Opinion received for PCT Patent Application No. PCT/EP2016/057470, dated Jun. 29, 2016, 9 pages.
Office Action Received for Singapore Application No. 10202005842Q, dated Mar. 16, 2022, 5 Pages (5 Pages of Official Copy).

* cited by examiner

*Primary Examiner* — Melissa A Rioja

(74) *Attorney, Agent, or Firm* — SHELL USA, INC.

(57) ABSTRACT

A process for the production of a polyurethane foam having a resilience of at least 50%, said process comprising reacting (i) a first polyether polyol comprising polyether chains containing no more than 20% ethylene oxide content, and having a primary hydroxyl content of no more than 25%; (ii) a second polyether polyol comprising polyether chains containing at least 50% ethylene oxide content; and (iii) one or more aromatic polyisocyanates, in the presence of one or more catalysts having gelling and/or blowing activities.

5 Claims, No Drawings

PROCESS FOR THE PRODUCTION OF POLYURETHANE FOAMS

CROSS REFERENCE TO RELATED APPLICATIONS

This is a national stage application of International application No. PCT/EP2016/081785, filed Dec. 19, 2016, which claims benefit of priority of Indian application No. 6795/CHE/2015, filed Dec. 21, 2015.

FIELD OF THE INVENTION

This invention relates to the use of polyether polyols in the preparation of polyurethane foams.

BACKGROUND TO THE INVENTION

Polyurethane (PU) foams have found extensive use in a multitude of industrial and consumer applications. This popularity is due to their wide-ranging mechanical properties and ability to be easily manufactured.

Polyurethanes are prepared by the reaction of polyisocyanates (e.g. diisocyanates) and polyols. These components are brought together along with a blowing agent, a suitable catalyst and optionally ancillary chemicals under reaction conditions in order to produce the desired foam. In the production of polyurethane different reactions, such as chain extension (growth or gel reactions) and 'blow' reactions, occur simultaneously.

The properties of polyurethane foams depend strongly upon the foaming and polymerizing efficiencies of the polyol which is in turn governed by the structural properties of the initiator, and the structure and properties of the polyether chains.

In order to produce high-resilience (HR) polyurethane foams, polyols containing longer, elastic polyether chains are generally used. However, longer chains give a lower concentration of hydroxyl groups which can lead to a misbalance of blow versus growth reactions.

When substituted alkylene oxides, such as propylene oxide (PO), are used in the production of polyether polyols, the terminal OH groups on the polyether chains are secondary. Such polyether polyols are, therefore, inherently less reactive than ones that contain terminal primary OH groups. As the gel reaction does not occur quickly enough with the secondary OH groups in comparison to the blow reaction, it is not possible to use such secondary OH group-containing polyether polyols directly in the production of high resilience PU foams. In such a case the PU network is not strong enough at the end of the blow reaction and the foam is liable to collapse.

In the prior art, this problem has been overcome by 'EO-tipping' the polyether chains. EO-tipping requires the reaction of a number of equivalents of ethylene oxide (EO) onto the end of the secondary OH group terminated chains. The resultant polyether polyols then have predominantly EO-terminated polyol chains, which provide primary OH groups suitable for use in the production of high resilience PU foams.

In practice, EO-tipping can only be achieved using a KOH-catalysed polyether formation reaction. When attempting to use double metal cyanide (DMC) catalysts in the EO-tipping process, the combination of the more active catalyst and the inherent activity of primary OH groups results in long chains of EO on only a few of the polyether chains rather than the EO content being evenly distributed over all of the polyether chains.

DMC-catalysed production of polyether polyols is faster and more efficient than the traditional KOH catalysed process. The process can also be run on a continuous system, rather than as a batch process, further increasing its efficiencies.

However, in order to produce EO-tipped polyether polyols suitable for the production of HR PU foams from polyols produced in a DMC-catalysed process, the polyether polyols must be subjected to a separate, batch EO-tipping step catalysed by KOH.

One solution for a process for the production of high resilience polyurethane foams from polyether polyols which may be made using a DMC-catalysed process was proposed in co-pending application IN 1854/CHE/2015. This was directed to the use of polyether polyols with a functionality in the range of from 2.9 to 4.5, an OH-value in the range of from 28 to 42 and containing 8 to 60wt % of ethylene oxide content randomly distributed throughout the polyether chains.

It continues to be desirable to provide improved processes for the production of high resilience polyurethane foam from a polyether polyol obtainable by a DMC catalysed process without the need for a separate, batch, KOH-catalysed EO tipping step.

SUMMARY OF THE INVENTION

The present invention provides a process for the production of a polyurethane foam having a resilience of at least 50%, said process comprising reacting (i) a first polyether polyol comprising polyether chains containing no more than 20% ethylene oxide content, and having a primary hydroxyl content of no more than 25%; (ii) a second polyether polyol comprising polyether chains containing at least 50% ethylene oxide content; and (iii) one or more aromatic polyisocyanates, in the presence of one or more catalysts having gelling and/or blowing activities.

DETAILED DESCRIPTION OF THE INVENTION

The present inventors have surprisingly found that high resilience (HR) polyurethane (PU) foams can be produced from non-EO-tipped polyether polyols by reacting said polyether polyols with one or more aromatic polyisocyanates, in the presence of one or more catalysts having gelling and/or blowing activities and a second polyether polyol with high EO content.

The process of the present invention produces a polyurethane foam with a resilience of at least 50%, preferably at least 54%. Resilience provides a measure of the surface elasticity of a foam and can relate to comfort or 'feel'. Resilience is typically measured by dropping a ~16 g steel ball onto a foam and measuring how high the ball rebounds, this test is typically referred to as "ball rebound test". Typically, for polyurethane foams, resilience ranges from about 30% up to 70%. There are additional ways of measuring comfort properties of foam for example ratio of foam hardness at 65% height deflection over foam hardness at 25% height deflection, such ratio is sometimes referred to as "SAG factor" or "Comfort factor" and higher the ratio better the comfort properties. For a furniture cushion this means as a person sits on the foam initially the surface of the foam is soft but as the person puts all his/her weight on the cushion foam is able to support the load. Typically ball rebound values are directly proportional to SAG factor, and as "ball rebound test" is easy to perform it is commonly used as method to measure comfort property of foam. Higher resilience in a foam hence often means that the foam, when used for example in cushions, provides better comfort properties.

The first polyether polyol comprises polyether chains containing no more than 20% ethylene oxide (EO) content, preferably no more than 15%. Preferably the first polyether polyol comprises polyether chains containing at least 3%, more preferably at least 5% ethylene oxide content. The first polyether polyol is not an 'EO-tipped' polyether polyol. That is to say that the EO content is not present solely at the ends of the polyether chains. Typically, the ethylene oxide content present in the polyether chains of the first polyether polyol is distributed within the polyether chains. This is reflected in the fact that the first polyether polyol has a primary hydroxyl content of no more than 20%

Preferably, the remainder of the alkylene oxide content in the polyether chains of the first polyether polyol is derived from propylene and/or butylene oxide. More preferably, the remainder of the alkylene oxide content in the polyether chains of the first polyether polyol are derived from propylene oxide. Therefore, the polyether chains of the first polyether polyol preferably comprise at least 80% propylene oxide content, more preferably at least 85% propylene oxide content.

The first polyether polyol is suitably based on a hydroxyl-containing starting compound, for example one or more polyfunctional alcohols, containing in the range of from 2 to 8 hydroxyl groups. Polyether polyols based on a mixture of such hydroxyl-containing starting compounds may be used. Examples of suitable polyfunctional alcohols comprise glycols, glycerol, pentaerythritol, trimethylolpropane, triethanolamine, sorbitol and mannitol. Advantageously, the first polyether polyol is based on a starting compound selected from glycerol or a mixture of propylene glycol (MPG) and glycerol.

The term "functionality" refers to the average number of reactive sites per molecule of polyol. It is well-known that polypropylene oxide forms some amount of monofunctional impurities when it is polymerized. As a result, the actual average functionalities of the polyether polyols tend to be somewhat lower than the nominal functionalities. For purposes of this invention, functionalities are all nominal functionalities, meaning that the functionality of a polyol is considered to be the same as that as its starter compound.

The first polyether polyol has a nominal functionality of at least 2.5, preferably at least 2.6, more preferably at least 2.7. The functionality of the first polyether polyol is at most 3.5, preferably at most 3.3, more preferably at most 3.1, most preferably at most 3.0.

The term 'hydroxyl value' is used herein to refer to the milligrams of potassium hydroxide equivalent to the hydroxyl content in one gram of polyol determined by wet method titration. The first polyether polyol used in the process of the present invention preferably has a hydroxyl value of at least 40. Preferably, the hydroxyl value is at least 45. Preferably, the hydroxyl value is at most 60, more preferably at most 56.

The nominal molecular weight of the first polyether polyol is preferably at least 2700 and at most 4700.

The first polyether polyol may be prepared by any suitable process known in the art, for example in a process catalysed by KOH. In a preferred embodiment of the invention, the first polyether polyol is prepared by ring-opening polymerization of alkylene oxide onto the hydroxyl containing starting material in the presence of a composite metal cyanide complex catalyst.

Composite metal cyanide complex catalysts are frequently also referred to as double metal cyanide (DMC) catalysts. A composite metal cyanide complex catalyst is typically represented by the following formula (1):

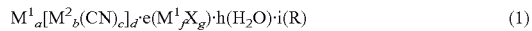
$$M^1_a[M^2_b(CN)_c]_d \cdot e(M^1_f X_g) \cdot h(H_2O) \cdot i(R) \qquad (1)$$

wherein each of $M^1$ and $M^2$ is a metal, X is a halogen atom, R is an organic ligand, and each of a, b, c, d, e, f, g, h and i is a number which is variable depending upon the atomic balances of the metals, the number of organic ligands to be coordinated, etc.

In the above formula (1), $M^1$ is preferably a metal selected from Zn(II) or Fe(II). In the above formula, $M^2$ is preferably a metal selected from Co(III) or Fe(III). However, other metals and oxidation states may also be used, as is known in the art.

In the above formula (1), R is an organic ligand and is preferably at least one compound selected from the group consisting of an alcohol, an ether, a ketone, an ester, an amine and an amide. As such an organic ligand, a water-soluble one may be used. Specifically, one or more compounds selected from tert-butyl alcohol, n-butyl alcohol, iso-butyl alcohol, tert-pentyl alcohol, isopentyl alcohol, N,N-dimethyl acetamide, glyme (ethylene glycol dimethyl ether), diglyme (diethylene glycol dimethyl ether), triglyme (triethylene glycol dimethyl ether), ethylene glycol mono-tert-butylether, iso-propyl alcohol and dioxane, may be used as organic ligand(s). The dioxane may be 1,4-dioxane or 1,3-dioxane and is preferably 1,4-dioxane. Most preferably, the organic ligand or one of the organic ligands in the composite metal cyanide complex catalyst is tert-butyl alcohol. Further, as an alcohol organic ligand, a polyol, preferably a polyether polyol may be used. More preferably, a poly (propylene glycol) having a number average molecular weight in the range of from 500 to 2,500 Dalton, preferably 800 to 2,200 Dalton, may be used as the organic ligand or one of the organic ligands. Most preferably, such poly (propylene glycol) is used in combination with tert-butyl alcohol as organic ligands.

The composite metal cyanide complex catalyst can be produced by known production methods.

In the DMC-catalysed production of polyether polyols, the composite metal cyanide complex catalyst is not removed entirely from the product. The first polyether polyol will, therefore, contain residue of the composite metal cyanide complex catalyst if produced by ring-opening polymerization of alkylene oxide(s) onto the hydroxyl containing starting material in the presence of a composite metal cyanide complex catalyst.

The second polyether polyol comprises polyether chains containing at least 50% ethylene oxide content. Preferably, the second polyether polyol comprises polyether chains containing at least 65% ethylene oxide content, more preferably at least 70% ethylene oxide content.

Preferably, the remainder of the alkylene oxide content in the polyether chains of the second polyether polyol is derived from propylene and/or butylene oxide. More preferably, the remainder of the alkylene oxide content in the polyether chains of the second polyether polyol is derived from propylene oxide. Therefore, the polyether chains of the second polyether polyol preferably comprise no more than 50% propylene oxide content, more preferably no more than 35% propylene oxide content, even more preferably no more than 30% propylene oxide content.

The distribution of the EO content contained within the polyether chains of the second polyether polyol is not key to the present invention. Preferably, the primary hydroxyl content of the second polyether polyol is more than 20%.

The second polyether polyol is suitably based on a hydroxyl-containing starting compound, for example one or more polyfunctional alcohols, containing in the range of from 2 to 8 hydroxyl groups. Polyether polyols based on a mixture of such hydroxyl-containing starting compounds may be used as the second polyether polyol. Examples of suitable polyfunctional alcohols comprise glycols, glycerol, pentaerythritol, trimethylolpropane, triethanolamine, sorbitol and mannitol. Advantageously, the second polyether polyol is based on a starting compound selected from glycerol or a mixture of propylene glycol (MPG) and glycerol.

The second polyether polyol preferably has a functionality of at least 1.5, preferably at least 2, more preferably at least 2.5. The functionality of the second polyether polyol is at most 4.5, preferably at most 4, more preferably at most 3.5.

The second polyether polyol used in the process of the present invention preferably has a hydroxyl value of at least 28. Preferably, the hydroxyl value is at most 48. The nominal molecular weight of the second polyether polyol is preferably at least 2500, more preferably at least 3000. Preferably the nominal molecular weight of the second polyether polyol is at most 6500, more preferably at most 5000.

The second polyether polyol may be prepared by any suitable process known in the art, for example by ring-opening polymerization of alkylene oxide onto the hydroxyl containing starting material in the presence of a composite metal cyanide complex catalyst or a KOH catalyst.

The weight percentage ratio of the first polyether polyol to the second polyether polyol is preferably at least 5:1, more preferably at least 8:1, even more preferably at least 10:1. The weight ratio of the first polyether polyol to the second polyether polyol is preferably at most 50:1, more preferably at least 33:1.

The aromatic polyisocyanate may for example comprise tolylene diisocyanate (TDI), diphenylmethane diisocyanate (MDI) or polymethylene polyphenyl isocyanate.

One or more aliphatic polyisocyanates, such as for example hexamethylene diisocyanate, xylylene diisocyanate, dicyclohexylmethane diisocyanate, lysine diisocyanate or tetramethylxylylene diisocyanate, an alicyclic polyisocyanate such as isophorone diisocyanate, or a modified product thereof may also be present.

In an embodiment, the aromatic polyisocyanate comprises or consists of a mixture of 80% w/w of 2,4-tolylene diisocyanate and 20% w/w of 2,6-tolylene diisocyanate, which mixture is known as "TDI-80".

In the aspects of the present invention, the molar ratio of isocyanate (NCO) groups in the polyisocyanate to hydroxyl (OH) groups in the polyether polyol and any water may suitably be at most 1/1, which corresponds to a TDI index of 100. In an embodiment, the TDI index is at most 90. Optionally, the TDI idex may be at most 85.

The TDI index may suitable be at least 70, in particular at least 75.

The foam-forming reactants may comprise an amount of aromatic polyisocyanate for providing the TDI index. In an embodiment the aromatic polyisocyanate is the sole isocyanate in the foam-forming reactants.

The blowing agent used to prepare the polyurethane foam of the present invention may advantageously comprise water. The use of water as a (chemical) blowing agent is well known. Water reacts with isocyanate groups according to the well-known $NCO/H_2O$ reaction, thereby releasing carbon dioxide which causes the blowing to occur.

However, other suitable blowing agents, such as for example, acetone, gaseous or liquid carbon dioxide, halogenated hydrocarbons, aliphatic alkanes and alicyclic alkanes may be employed additionally or alternatively.

Due to the ozone depleting effect of fully chlorinated, fluorinated alkanes (CFC's) the use of this type of blowing agent is generally not preferred, although it is possible to use them within the scope of the present invention. Halogenated alkanes, wherein at least one hydrogen atom has not been substituted by a halogen atom (the so-called HCFC's) have no or hardly any ozone depleting effect and therefore are the preferred halogenated hydrocarbons to be used in physically blown foams. One suitable HCFC type blowing agent is 1-chloro-1,1-difluoroethane.

It will be understood that the above blowing agents may be used singly or in mixtures of two or more. The amounts in which the blowing agents are to be used are those conventionally applied, i.e.: in the range of from 0.1 to 10 per hundred parts by weight of polyol component (pphp), in particular in the range of from 0.1 to 5 pphp, more in particular in the range of from 0.5 to 3 pphp in case of water; and between about 0.1 and 50 pphp in particular in the range of from 0.1 to 20 pphp, more in particular in the range of from 0.5 to 10 pphp in case of halogenated hydrocarbons, aliphatic alkanes and alicyclic alkanes.

Additionally, other components may also be present during the polyurethane preparation process of the present invention, such as surfactants and/or cross-linking agents.

The use of foam stabilisers (surfactants) is well known. Organosilicone surfactants are most conventionally applied as foam stabilisers in polyurethane production. A large variety of such organosilicone surfactants is commercially available. Usually, such foam stabiliser is used in an amount of from 0.01 to 5.0 parts by weight per hundred parts by weight of polyol component (pphp). Preferred amounts of stabiliser are from 0.25 to 1.0 pphp.

The use of cross-linking agents in the production of polyurethane foams is also well known. Polyfunctional glycol amines are known to be useful for this purpose. The polyfunctional glycol amine which is most frequently used and is also useful in the preparation of the present flexible polyurethane foams, is diethanol amine, often abbreviated as DEOA. If used at all, the cross-linking agent is applied in amounts up to 2 parts by weight per hundred parts by weight of polyol component (pphp), but amounts in the range of from 0.01 to 0.5 pphp are most suitably applied.

In addition, other well-known auxiliaries, such as fillers and flame retardants may also form part of the foam-forming reactants.

Suitably, flame retardant may be present in a "flame retardant effective amount", i.e. an amount of total flame retardant sufficient to impart flame resistance to the polyurethane foam sufficient to pass a flame resistance standard, e.g. BS 5852, Part 2, Crib 5 or Cal 117 Section A—Part 1.

The total amount of flame retardant may suitably be in the range of from 10 to hundred parts by weight per hundred parts by weight of polyol component (pphp), in particular between about 20 and about 80 pphp.

In an embodiment, melamine or a melamine derivative is used as a principal flame retardant. Suitably, melamine may be employed together with a supplemental flame retardant, e.g. a halogenated phosphate.

The melamine useful in the present invention is suitably employed in an amount of between about 5 and about 50 parts by weight per hundred parts by weight of polyol component (pphp), preferably between about 20 and about 50 pphp in the urethane-forming reaction mixture.

The melamine and/or its derivatives can be used in any form, as may be desired, including solid or liquid form, ground (e.g., ball-milled) or unground, as may be desired for any particular application.

The supplemental flame retardant, such as halogenated phosphate, may suitably be employed in an amount of between about 10 and about 30 pphp, preferably between about 15 and about 25 pphp. An example of a suitable halogenated phosphate flame retardant is tris-mono-chloro-propyl-phosphate (TMCP), commercially available, for example, under the name Antiblaze (RTM).

The reaction to produce the polyurethane foam is carried out in the presence of one or more catalysts having gelling and/or blowing activities.

Polyurethane catalysts are known in the art and include many different compounds and mixtures thereof. Amines and organometallics are generally considered most useful. Suitable organometallic catalysts include tin-, lead- or titanium-based catalysts, preferably tin-based catalysts, such as tin salts and dialkyl tin salts of carboxylic acids. Specific examples are stannous octoate, stannous oleate, dibutyltin dilaureate, dibutyltin acetate and dibutyltin diacetate. Suitable amine catalysts are tertiary amines, such as, for instance, bis(2,2'-dimethylamino) ethyl ether, trimethylamine, triethylamine, triethylenediamine and dimethylethanolamine (DMSA). Examples of commercially available tertiary amine catalysts are those sold under the tradenames NIAX, TEGOAMIN and DABCO (all trademarks). The catalyst is typically used in an amount of from 0.01 to 2.0 parts by weight per hundred parts by weight of polyether polyol (php). Preferred amounts of catalyst are from 0.05 to 1.0 php.

In general, the process or use of the invention may involve combining the polyol component, the foam-forming reactants and the one or more catalyst in any suitable manner to obtain the polyurethane foam.

In an embodiment, the process comprises stirring the polyol component, the foam-forming reactants (except the polyisocyanate) and the one or more catalyst together for a period of at least 1 minute; and adding the polyisocyanate under stirring.

In an embodiment, the full rise time (FRT, measured as the time from start of aromatic isocyanate addition/mixing to end of foam rise) is no greater than 360 seconds, in particular no greater than 250 seconds, such as no greater than 240 seconds.

In an embodiment, the process comprises forming the foam into a shaped article before it fully sets. Suitably, forming the foam may comprise pouring the polyol component, the foam-forming reactants and the one or more catalyst into a mould before gelling is complete.

Throughout the description and claims of this specification, the words "comprise" and "contain" and variations of the words, for example "comprising" and "comprises", mean "including, but not limited to", and do not exclude other moieties, additives, components, integers or steps. Moreover the singular encompasses the plural unless the context otherwise requires: in particular, where the indefinite article is used, the specification is to be understood as contemplating plurality as well as singularity, unless the context requires otherwise.

Preferred features of each aspect of the invention may be as described in connection with any of the other aspects. Other features of the invention will become apparent from the following examples. Generally speaking the invention extends to any novel one, or any novel combination, of the features disclosed in this specification (including any accompanying claims and drawings). Thus features, integers, characteristics, compounds, chemical moieties or groups described in conjunction with a particular aspect, embodiment or example of the invention are to be understood to be applicable to any other aspect, embodiment or example described herein unless incompatible therewith. Moreover unless stated otherwise, any feature disclosed herein may be replaced by an alternative feature serving the same or a similar purpose.

Where upper and lower limits are quoted for a property then a range of values defined by a combination of any of the upper limits with any of the lower limits may also be implied.

In this specification, references to component properties are—unless stated otherwise—to properties measured under ambient conditions, i.e. at atmospheric pressure and at a temperature of about 23° C.

The present invention will now be further illustrated in the following, non-limiting examples.

EXAMPLES

Examples 1 to 4 were run as set out in Tables 1 and 2. Caradol SC48-08 is an EO/PO based polyol with an OH—value of 48, an EO-content of 10.5%, a PHC of 10% and a nominal functionality of 3. Caradol SP30-15 is an EO/PO based polyol also containing 15% styrene-acrylonitrile (SAN) polymer. The polyol has an OH value of 30 an EO—content of approximately 15% and a nominal functionality of 3. Polyol 2 has an EO content of 75%, a molecular weight of 4600, an OH value of 35 and a nominal functionality of 3. Its primary hydroxyl content is 90%.

These polyols were used to make polyurethane foams according to standard processes, as set out in Tables 1 and 2.

Examples 1 and 2 were carried out using a 60 litre volume box.

TABLE 1

Examples 1 and 2

|  |  | Comparative Example 1 | Example 2 |
| --- | --- | --- | --- |
| Caradol SP30-15 | pbw | 100 | 0 |
| Caradol SC48-08 | pbw | 0 | 95 |
| Polyol 2 | pbw | 0 | 5 |
| Total water | php | 2.4 | 2.7 |
| urea | php | 0.2 | 0 |
| Ortegol 204 | php | 1.4 | 0 |
| DEOA | php | 0.8 | 0 |
| Amine catalyst | php | 0.05 | 0.16 |
| Tin catalyst | php | 0.15 | 0.2 |
| Silicone | php | 0.3 | 0.4 |
| TDI Index |  | 102 | 107 |
| Foam full rise time | s | 141 | 133 |
| Foam Density | Kg/m$^3$ | 33.3 | 32.8 |
| Resilience | % | 57 | 55 |
| Porosity (Before foam crushed) | Lit/min | 14 | 130 |
| Porosity (after crushing) | Lit/min | 139 | 132 |

TABLE 1-continued

Examples 1 and 2

|  |  | Comparative Example 1 | Example 2 |
| --- | --- | --- | --- |
| CLD @ 40% | kPa | 2.8 | 3.0 |
| Dry Compression set @ 75% | % | 4.7 | 3.0 |
| Wet compression set @ 75% | % | 6.2 | 3.8 |

The hardness (CLD 40%) of the foam made in Example 2 was slightly higher than that made in Comparative Example 1, which was a typical HR formulation containing 15% SAN solid HR polyol.

Further, the foam made in Example 2 was more open than that of foam made in Comparative Example 1 before the foam is crushed, which is desirable in customer's perspective.

Examples 3 and 4 were carried out using a 600 litre volume box.

TABLE 2

Examples 3 and 4

|  |  | Comparative Example 3 | Example 4 |
| --- | --- | --- | --- |
| Caradol SP30-15 | pbw | 100 | 0 |
| Caradol SC48-08 | pbw | 0 | 95 |
| Polyol 2 | pbw | 0 | 5 |
| Total water | php | 2.4 | 2.7 |
| urea | php | 0.2 | 0 |
| Ortegol 204 | php | 1.4 | 0 |
| DEoA | php | 0.8 | 0 |
| Amine catalyst | php | 0.05 | 0.16 |
| Tin catalyst | php | 0.18 | 0.2 |
| Silicone | php | 0.3 | 0.4 |
| TDI Index |  | 102 | 107 |
| Foam full rise time | s | 120 | 125 |
| Density | Kg/m³ | 33.9 | 34.5 |
| Resilience | % | 60 | 61 |
| Porosity (Before foam crushed) | Lit/min | 23 | 54 |
| Porosity (after foam crushed) | Lit/min | 120 | 55 |
| CLD @ 40% | kPa | 2.1 | 3.5 |
| Dry Compression set @ 75% | % | 5.3 | 4 |
| Wet compression set @ 75% | % | 11.7 | 5.4 |

These Examples also show that the porosity of the foam made in Example 4 was higher than that made in Comparative Example 3, which was a typical HR formulation containing 15% SAN solid HR polyol.

Further, the foam made in Example 4 had improved hardness than that made in Comparative Example 3.

Both sets of Examples demonstrate improved dry and wet compression sets for the examples of the present invention.

That which is claimed is:

1. A process for the production of a polyurethane foam having a resilience of at least 50% measured by ball rebound test, said process comprising (1) reacting (i) a first polyether polyol comprising polyether chains containing at least 3 wt % and no more than 20 wt % oxyethylene content, and having a primary hydroxyl content of no more than 20% and a functionality of at most 3.5 and a hydroxyl value of at least 40 mg KOH/g; (ii) a second polyether polyol comprising polyether chains containing at least 50 wt % oxyethylene content and having a hydroxyl value of at most 48 mg KOH/g; and (iii) one or more aromatic polyisocyanates, in the presence of one or more catalysts having gelling and/or blowing activities, and (2) allowing a full rise of the foam, wherein the weight ratio of the first polyether polyol to the second polyether polyol is at least 5:1, and wherein the first polyether polyol is prepared by ring-opening polymerisation of alkylene oxides onto a hydroxyl containing starting material in the presence of a composite metal cyanide complex catalyst.

2. The process according to claim 1, wherein the first polyether polyol comprises at least 80 wt % oxypropylene content.

3. The process according to claim 1, wherein the second polyether polyol contains at least 65 wt % oxyethylene content.

4. The process according to claim 1, wherein a primary hydroxyl content of the second polyether polyol is more than 20%.

5. The process according to claim 1, wherein a remainder of an alkylene oxide content in the polyether chains of the second polyether polyol is derived from propylene oxide.

* * * * *